United States Patent
Lee et al.

(10) Patent No.: US 12,431,569 B2
(45) Date of Patent: Sep. 30, 2025

(54) LITHIUM SECONDARY BATTERY AND METHOD OF FABRICATING THE SAME

(71) Applicant: SK INNOVATION CO., LTD., Seoul (KR)

(72) Inventors: Jong Hyuk Lee, Daejeon (KR); Su Hee Han, Daejeon (KR)

(73) Assignee: SK ON CO., LTD., Seoul (KR)

( * ) Notice: Subject to any disclaimer, the term of this patent is extended or adjusted under 35 U.S.C. 154(b) by 159 days.

(21) Appl. No.: 17/443,685

(22) Filed: Jul. 27, 2021

(65) Prior Publication Data

US 2022/0037728 A1 Feb. 3, 2022

(30) Foreign Application Priority Data

Jul. 30, 2020 (KR) .................. 10-2020-0095533

(51) Int. Cl.
*H01M 50/227* (2021.01)
*H01M 10/0525* (2010.01)
*H01M 50/211* (2021.01)

(52) U.S. Cl.
CPC ..... *H01M 50/227* (2021.01); *H01M 10/0525* (2013.01); *H01M 50/211* (2021.01)

(58) Field of Classification Search
CPC ........... H01M 50/227; H01M 10/0525; H01M 50/211; H01M 50/105
See application file for complete search history.

(56) References Cited

U.S. PATENT DOCUMENTS

| | | | | |
|---|---|---|---|---|
| 2011/0311852 A1* | 12/2011 | Mineya | ............. | H01M 10/0587 429/94 |
| 2016/0133883 A1* | 5/2016 | Hwang et al. | ....... | H01M 50/119 429/176 |
| 2016/0141728 A1* | 5/2016 | Fauteux et al. | ....... | H01M 50/51 429/61 |
| 2018/0358592 A1* | 12/2018 | Park et al. | ............... | C08K 5/49 |

FOREIGN PATENT DOCUMENTS

| CN | 105280866 A | * | 1/2016 | ........ H01M 10/0525 |
|---|---|---|---|---|
| CN | 111386615 A | | 7/2020 | |
| JP | 2016-091999 A | | 5/2016 | |
| JP | 6499581 B2 | | 4/2019 | |
| KR | 10-2009-0083283 A | | 8/2009 | |
| KR | 10-2012-0058676 A | | 6/2012 | |
| KR | 10-2014-0065593 A | | 5/2014 | |
| KR | 10-1510076 B1 | | 4/2015 | |

(Continued)

OTHER PUBLICATIONS

Li, Zhen-yong, CN 105280866 A English Translation, Jan. 27, 2016.*

(Continued)

*Primary Examiner* — Matthew T Martin
*Assistant Examiner* — Alexandra J Simmons
(74) *Attorney, Agent, or Firm* — IP & T GROUP LLP (57) ABSTRACT

A lithium secondary battery according to an embodiment of the present invention includes a stack structure including a plurality of pouch cells and an elastic foam layer formed on an outer surface of at least one of the plurality of pouch cells. A uniform pressure may be provided by the elastic foam layer to prevent deformation of the battery due to contraction and expansion of the electrode.

12 Claims, 3 Drawing Sheets

(56) References Cited

FOREIGN PATENT DOCUMENTS

| | | |
|---|---|---|
| KR | 10-2015-0050081 A | 5/2015 |
| WO | 2014-208423 A1 | 12/2014 |
| WO | 2017/171509 A1 | 10/2017 |

OTHER PUBLICATIONS

Extended European Search Report issued by the European Patent Office on Dec. 2, 2021.
Office Action for Korean Patent Application No. 10-2020-0095533 issued by the Korean Patent Office on Apr. 14, 2025.

* cited by examiner

LITHIUM SECONDARY BATTERY AND METHOD OF FABRICATING THE SAME

CROSS-REFERENCE TO RELATED APPLICATION AND CLAIM OF PRIORITY

This application claims priority to Korean Patent Application No. 10-2020-0095533 filed on Jul. 30, 2020 in the Korean Intellectual Property Office (KIPO), the entire disclosure of which is incorporated by reference herein.

BACKGROUND

1. Field

The present invention relates to a lithium secondary battery and a method of fabricating the same.

2. Description of the Related Art

A secondary battery which can be charged and discharged repeatedly has been widely employed as a power source of a mobile electronic device such as a camcorder, a mobile phone, a laptop computer, etc., according to developments of information and display technologies. Recently, a battery pack including the secondary battery is being developed and applied as a power source of an eco-friendly vehicle such as a hybrid automobile.

The secondary battery includes, e.g., a lithium secondary battery, a nickel-cadmium battery, a nickel-hydrogen battery, etc. The lithium secondary battery is highlighted due to high operational voltage and energy density per unit weight, a high charging rate, a compact dimension, etc.

The lithium secondary battery may be categorized by an electrolyte type as a lithium ion battery using a liquid electrolyte, and a lithium ion polymer battery using a polymer solid electrolyte. The lithium-ion polymer battery may be categorized by a polymer solid electrolyte type as a fully solid lithium ion polymer battery that does not contain the liquid electrolyte at all, and a lithium ion polymer battery using a gel polymer electrolyte that contains the liquid electrolyte.

The lithium secondary battery may be formed in various shapes, e.g., a cylindrical shape, a prismatic shape, a pouch shape, etc. An electrode assembly in which a cathode, an anode and a separation layer (separator) interposed therebetween are stacked or wound is provided at an inside of an exterior material of the lithium secondary battery.

The pouch-type secondary battery contracts and expands while electrodes included therein contracts and expands during charging and discharging. If the contraction and expansion are repeated, lithium ions may be precipitated and life-span of the battery may be decreased.

For example, Japanese Registered Patent Publication No. 6499581 discloses a film sheet and a battery pack case having improved flame retardancy, but does not provide an effective solution for improving life-span of the battery.

SUMMARY

According to an aspect of the present invention, there is provided a lithium secondary battery having improved operational stability, electrical property and life-span property.

According to an aspect of the present invention, there is provided a method of fabricating a lithium secondary battery having improved operational stability, electrical property and life-span property.

According to exemplary embodiments of the present invention, a lithium secondary battery includes a stack structure including a plurality of pouch cells, and an elastic foam layer formed on an outer surface of at least one of the plurality of pouch cells.

In some embodiments, the elastic foam layer may be a coating layer directly formed on the outer surface of the at least one of the plurality of pouch cells.

In some embodiments, the elastic foam layer may be a film layer.

In some embodiments, the elastic foam layer may be disposed on facing surface of two different pouch cells of the plurality of pouch cells.

In some embodiments, the elastic foam layer may be disposed on an outermost surface of the stack structure.

In some embodiments, the elastic foam layer may include at least one selected from the group consisting of polyurethane (PUR), polystyrene (PS) and polyolefin.

In some embodiments, a tensile modulus of the elastic foam layer may be from 200 MPa to 800 MPa.

In some embodiments, a porosity of the elastic foam layer may be from 60% to 90%.

In some embodiments, the elastic foam layer may include a cured product of a composition including a foaming agent, a polyol and an isocyanate.

In some embodiments, the elastic foam layer may include at least one of a flame retardant and a conductive material.

In some embodiments, the foaming agent may be included in an amount from 0.1 wt % to 5 wt % based on a total weight of the composition.

In some embodiments, a thickness of the elastic foam layer may be from 0.1 mm to 10 mm.

In a method of fabricating a lithium secondary battery according to exemplary embodiments of the present invention, a plurality of pouch cells in which an electrode assembly including a cathode and an anode is accommodated are prepared. The plurality of pouch cells are stacked. An elastic foam layer is formed on an outer surface of at least one of the plurality of pouch cells.

In some embodiments, the forming the elastic foam layer may be performed during the stacking the plurality of pouch cells.

In some embodiments, the forming the elastic foam layer is performed after the stacking the plurality of pouch cells.

In some embodiments, the preparing the plurality of pouch cells may include accommodating the electrode assembly in a cell case after forming a preliminary elastic foam layer on the cell case. The forming the elastic foam layer may include foaming the preliminary elastic foam layer.

In some embodiments, a preliminary foam layer may be formed during the stacking the plurality of pouch cells. The forming the elastic foam layer may include foaming the preliminary foam layer after the stacking the plurality of pouch cells.

In some embodiments, the elastic foam layer comprises may be formed by coating a composition including a foaming agent, a polyol and an isocyanate on the outer surface of the at least one of the plurality of pouch cells.

In some embodiments, the elastic foam layer may be formed by curing the composition by a thermal curing or a UV curing.

In some embodiments, the forming the elastic foam layer may include attaching an elastic foam film on the outer surface of the at least one of the plurality of pouch cells.

A lithium According to exemplary embodiments of the present invention may include a plurality of pouch cells, and may include an elastic foam layer attached to an outer surface of at least one of the plurality of pouch cells. In this case, a uniform pressure may be applied to each surface of the pouch cell, so that stability and life-span properties of the battery may be improved even when contraction and expansion of electrodes occur during charging and discharging of the battery.

In some embodiments, the elastic foam layer may include a foam. For example, the elastic foam layer may include at least one of polyurethane (PUR), polystyrene (PS) and polyolefin. Thus, a composition, a coating thickness and a foaming ratio, etc. of the foam may be property modified in consideration of a material of the pouch cell and a module design of various pouch cells.

DETAILED DESCRIPTION OF THE EMBODIMENTS

According to exemplary embodiments of the present invention, a lithium secondary battery including a plurality of pouch cells and an elastic foam layer. Further, a method for fabricating the lithium secondary battery is also provided.

Hereinafter, the present invention will be described in detail with reference to the accompanying drawings. However, those skilled in the art will appreciate that such embodiments described with reference to the accompanying drawings are provided to further understand the spirit of the present invention and do not limit subject matters to be protected as disclosed in the detailed description and appended claims.

In the accompanying drawings, a pouch cell 200 may include a first surface from which an electrode lead is formed, a second surface opposite to the first surface, and four surfaces perpendicular to the first surface and the second surface. The four surfaces include a third surface having a larger area, a fourth surface facing the third face, a fifth surface having a smaller area and a sixth face opposing the fifth face.

Two directions that are parallel to the third surface or the fourth surface and intersect each other are defined as a first direction and a second direction. For example, the first direction and the second direction may be perpendicular to each other. A direction perpendicular to the third or fourth surface of the pouch cell 200 is defined as a third direction. For example, the first direction may correspond to a width direction of the pouch cell 200, the second direction may correspond to a length direction of the pouch cell 200 and the third direction may correspond to a thickness direction of the pouch cell 200.

Figure 1:
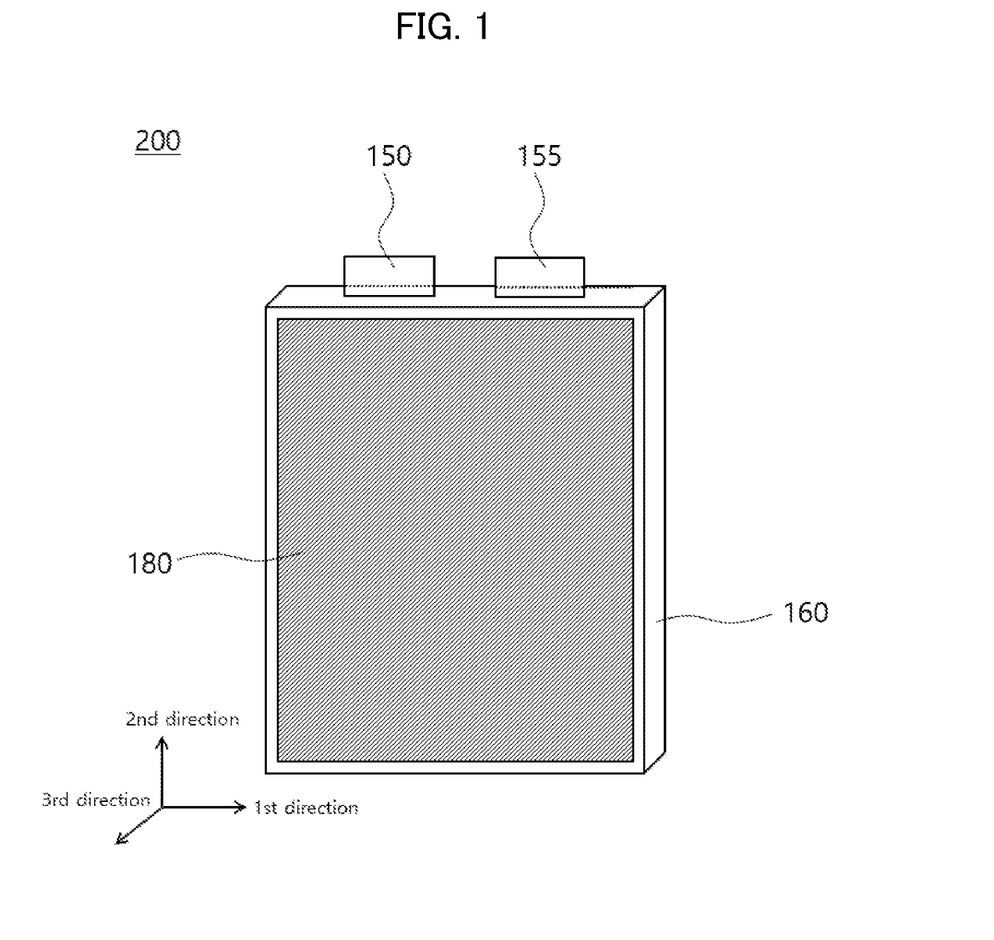
FIG. 1 is a schematic perspective view illustrating a lithium secondary battery in accordance with exemplary embodiments.
Figure 2:
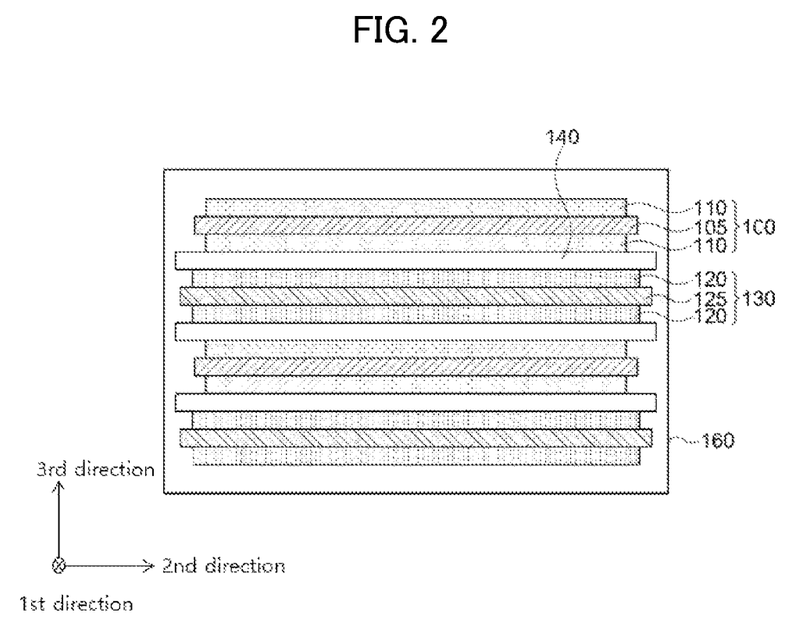
FIG. 2 is a schematic cross-sectional view illustrating a pouch cell in accordance with exemplary embodiments.

FIG. 1 is a schematic perspective view illustrating a lithium secondary battery in accordance with exemplary embodiments. FIG. 2 is a schematic cross-sectional view illustrating a pouch cell in accordance with exemplary embodiments.

Specifically, FIG. 1 is a schematic perspective view illustrating one of a plurality of pouch cells 200 included in the lithium secondary battery.

Referring to FIGS. 1 and 2, the pouch cell 200 may include an electrode assembly, a cell case 160 and an elastic foam layer 180.

The electrode assembly may include, e.g., a cathode 100, an anode 130 and a separation layer 140 interposed between the cathode and the anode. Detailed construction of the electrode assembly will be described later with reference to FIG. 2.

The electrode assembly may be accommodated and impregnated with an electrolyte in the cell case 160.

In exemplary embodiments, the cell case 160 may be a pouch-type exterior material. For example, the cell case 160 may be a pouch-type case in which the electrode assembly and the electrolyte are sealed by a sealing area of an edge portion and heat-sealed with a sealing member through a portion of the sealing area of the edge portion. For example, the pouch-type exterior material may include an intermediate layer that may be a metal layer, and insulating films that may be formed on upper and lower surfaces of the metal layer.

In exemplary embodiments, the elastic foam layer 180 may be formed on an outer surface of at least one pouch cell 200 included in a battery cell module. For example, the elastic foam layer 180 may be formed on at least one surface of the first to sixth surfaces of the pouch cell 200 and may be formed to partially or entirely cover the at least one surface. In this case, a thickness and a foaming ratio of the elastic foam layer 180 may be partially adjusted.

When charging and discharging are repeated in the pouch cell, local deformation of the electrode may occur, and uniform pressure may not be applied to the electrode assembly due to a property of a pouch film which is a packaging material to cause a non-uniform surface pressure.

The non-uniform surface pressure may cause a local voltage gradient in the pouch cell, thereby causing precipitation of lithium ions and reduced life-span. The elastic foam layer 180 may be used to apply a uniform surface pressure to enhance charge/discharge properties in the pouch cell 200, thereby improving the life-span of the battery.

In some exemplary embodiments, the elastic foam layer 180 may be disposed on a surface facing the different pouch cell 200. For example, the elastic foam layer 180 may be formed wholly or partially on the third and fourth surfaces that may have relatively large areas of the outer surfaces of the pouch cell 200.

In this case, the uniform surface pressure may be applied to provide enhanced charging and discharging property within the pouch cell 200 while achieving a sufficient space for an expansion of the pouch cell 200. Further, deformation of the pouch cells 200 occurring in the large area may be more effectively suppressed and damages between the plurality of the pouch cells 200 may be prevented.

In some embodiments, a plurality of pouch cells 200 may be stacked to define a cell stack structure, and the elastic foam layer 180 may be disposed on an outermost surface of the cell stack structure. For example, the elastic foam layer 180 may be disposed on at least one surface of the pouch cell 200 disposed at an outermost side of the cell stack structure. In this case, the above-described expansion space of the pouch cell 200 and uniform surface pressure may be more effectively implemented.

In some embodiments, the elastic foam layer 180 may be a coating layer coated directly on the outer surface of the pouch cell 200. For example, the electrode assembly may be accommodated after coating and curing a composition for forming an elastic foam layer on the cell case 160 of the pouch cell 200. Alternatively, the elastic foam layer 180 may be formed by applying and curing the composition after accommodating the electrode assembly in the cell case 160.

A thickness, a composition, a foaming ratio, etc., of the elastic foam layer 180 may be adjusted, so that the uniform surface pressure may be applied to the surfaces of the lithium secondary battery, and a cell assembly and/or lamination process may be efficiently performed.

In some embodiments, the elastic foam layer 180 may be a film attached to the outer surface of the pouch cell 200. For example, an adhesive layer such as an adhesive or an adhesive tape may be formed to adhere the film for forming the elastic foam layer to the pouch cell 200. In an embodiment, the electrode assembly may be accommodated after attaching the film for forming the elastic foam layer to the cell case 160. Alternatively, after accommodating the electrode assembly in the cell case 160, the film for forming the elastic foam layer may be attached.

For example, the elastic foam layer 180 may be formed commonly on the plurality of the pouch cells 200, so that the uniform surface pressure may be provided entirely on the plurality of the pouch cells 200 or the plurality of the cell stack structures.

In exemplary embodiments, the elastic foam layer 180 may include an elastic polymer, e.g., at least one of polyurethane (PUR), polystyrene (PS) and polyolefin. In a preferable embodiment, the elastic foam layer 180 may include polyurethane.

The elastic foam layer 180 having a porous shape may be formed by densely dispersing a gas in the elastic polymer. In an embodiment, the elastic foam layer 180 may be formed by combining two or more of the elastic polymers such as polyurethane, polystyrene, polyolefin, etc. In an embodiment, the elastic foam layer 180 may include polyurethane, and may further include at least one of polystyrene or polyolefin.

In some embodiments, the elastic foam layer 180 may include a cured product of a composition including a foaming agent, a polyol and an isocyanate. The composition may further include a component for forming an elastic body such as polystyrene and polyolefin.

For example, the foaming agent may be added to polyurethane produced by ae reaction of the polyol having a hydroxyl group and the isocyanate having an isocyanate group. The elastic foam layer 180 having a cell structure may be formed through generation of micelles, and growth and stabilization of bubbles induced by the foaming agent.

Thus, when a plurality of the pouch cells 200 are stacked to form the battery module, the uniform surface pressure may be applied to the pouch cell 200 against contraction and expansion of the electrode due to repeated charging and discharging, and stability and life-span of the battery module may be improved.

In exemplary embodiments, the foaming agent may be included in an amount of 0.1 weight percent (wt %) to 5 wt % based on a total weight of the composition. If the amount of the foaming agent is less than 0.1 wt % based on the total weight of the composition, a foaming gas may not be sufficiently filled in the elastic foam layer 180 and physical properties such as heat storage and elasticity may be degraded.

If the amount of the foaming agent exceeds 5 wt % based on the total weight of the composition, the elastic foam layer 180 capable of providing the uniform surface pressure to various pouch cell designs may not be easily formed.

An average thickness of the elastic foam layer 180 may be from about 0.1 mm to 10 mm. For example, if the thickness of the elastic foam layer 180 is less than 0.1 mm, the effect of preventing deformation of the pouch cell 200 may not be sufficiently implemented. Additionally, if the thickness of the elastic foam layer 180 exceeds 10 mm, a lithium secondary battery having a thin and compact dimension may not be easily achieved.

In exemplary embodiments, a tensile modulus of the elastic foam layer 180 may be from 200 MPa to 800 MPa. If the elastic modulus of the elastic foam layer 180 is less than 200 MPa, a sufficient pressure to prevent bending and twisting of the pouch cell may not be applied.

If the tensile modulus of the elastic foam layer 180 exceeds 800 MPa, deformation of the cell case 160 may be caused, and the lithium secondary battery having a thin and compact dimension may not be easily achieved. The tensile modulus may be adjusted according to the thickness and the composition of the elastic foam layer 180.

In exemplary embodiments, a porosity of the elastic foam layer 180 may be from 60% to 90%. If the porosity of the elastic foam layer 180 is less than 60%, physical properties such as heat storage and elasticity provided by the foam gas filled in the bubbles may be degraded. If the porosity of the elastic foam layer 180 exceeds 80%, the above-described tensile modulus range may not be easily implemented while fabricating the lithium secondary battery of the thin and compact dimension.

In some embodiments, the elastic foam layer 180 may include at least one of a flame retardant and a conductive material. For example, the composition including the elastic polymer and the foaming agent may further include the flame retardant and/or the conductive material. In this case, incombustibility, heat dissipation and rigidity of the elastic foam layer 180 may be improved, and the elastic foam layer 180 that is a coating layer or film layer added to the pouch cell may be utilized for various purpose.

In some embodiments, electrode tabs (a cathode tab and an anode tab) may protrude from the cathode current collector 105 and the anode electrode current collector 125 included in each electrode cell to one side of the cell case 160. The electrode tabs may be welded together with the one side of the cell case 160 to form an electrode lead (a cathode lead 150 and an anode 155) extending or exposed to an outside of the case 160.

As illustrated in FIG. 2, the electrode may include a cathode 100, an anode 130 and a separation layer 140 interposed between the cathode and the anode. The electrode assembly may be accommodated in the cell case 160 together with the electrolyte to be impregnated therein.

The cathode 100 may include a cathode active material layer 110 formed by coating a cathode active material on a cathode current collector 105.

The cathode active material may include a compound capable of reversibly intercalating and de-intercalating lithium ions.

In exemplary embodiments, the cathode active material may include a lithium-transition metal oxide. For example, the lithium-transition metal oxide may include nickel (Ni), and may further include at least one of cobalt (Co) and manganese (Mn).

For example, the lithium-transition metal oxide may be represented by Chemical Formula 1 below.

$$Li_{1+a}Ni_{1-(x+y)}Co_xM_yO_2 \qquad \text{[Chemical Formula 1]}$$

In the Chemical Formula 1 above, $-0.05 \leq a \leq 0.15$, $0.01 \leq x \leq 0.3$, $0.01 \leq y \leq 0.3$, and M may include at least one element selected from Mn, Mg, Sr, Ba, B, Al, Si, Ti, Zr and W.

A slurry may be prepared by mixing and stirring the cathode active material in a solvent with a binder, a conductive agent and/or a dispersive agent. The slurry may be coated on the cathode current collector 105, and then pressed and dried to form the cathode 100.

The anode 130 may include an anode current collector 125 and an anode active material layer 120 formed by coating a slurry including an anode active material on the anode current collector 125.

A slurry may be prepared by mixing and stirring the anode active material in a solvent with a binder, a conductive agent and/or a dispersive agent. The slurry may be coated on the anode current collector 125, and then pressed and dried to form the anode 130.

In an embodiments, an electrode density of the anode active material layer formed by coating the anode active material be 1.45 $g/cm^3$ or more. Within this range, the lithium secondary battery having improved power, life-span and high temperature storage properties may be provided.

The separation layer 140 may be interposed between the cathode 100 and the anode 130. The separation layer 140 may include a porous polymer film prepared from, e.g., a polyolefin-based polymer such as an ethylene homopolymer, a propylene homopolymer, an ethylene/butene copolymer, an ethylene/hexene copolymer, an ethylene/methacrylate copolymer, or the like. The separation layer 140 may also include a non-woven fabric formed from a glass fiber with a high melting point, a polyethylene terephthalate fiber, or the like.

In some embodiments, an area and/or a volume of the anode 130 (e.g., a contact area with the separation layer 140) may be greater than that of the cathode 100. Thus, lithium ions generated from the cathode 100 may be easily transferred to the anode 130 without a loss by, e.g., precipitation or sedimentation.

In exemplary embodiments, an electrode cell may be defined by the cathode 100, the anode 130 and the separation layer 140, and a plurality of the electrode cells may be stacked to form the electrode assembly that may have e.g., a jelly roll shape. For example, the electrode assembly may be formed by winding, laminating or folding the separation layer 140.

The electrode assembly may be accommodated together with an electrolyte in the cell case 160 to define the lithium secondary battery. In exemplary embodiments, a non-aqueous electrolyte may be used as the electrolyte.

For example, the non-aqueous electrolyte may include a lithium salt and an organic solvent. The lithium salt commonly used in the electrolyte for the lithium secondary battery may be used, and may be represented by $Li^+X^-$.

An anion of the lithium salt $X^-$ may include, e.g., $F^-$, $Cl^-$, $Br^-$, $I^-$, $NO_3^-$, $N(CN)_2^-$, $BF_4^-$, $ClO_4^-$, $PF_6^-$, $(CF_3)_2PF_4^-$, $(CF_3)_3PF_3^-$, $(CF_3)_4PF_2^-$, $(CF_3)_5PF^-$, $(CF_3)_6P^-$, $CF_3SO_3^-$, $CF_3CF_2SO_3^-$, $(CF_3SO_2)_2N^-$, $(FSO_2)_2N^-$, $CF_3CF_2(CF_3)_2CO^-$, $(CF_3SO_2)_2CH^-$, $(SF_5)_3C^-$, $(CF_3SO_2)_3C^-$, $CF_3(CF_2)_7SO_3^-$, $CF_3CO_2^-$, $CH_3CO_2^-$, $SCN^-$, $(CF_3CF_2SO_2)_2N^-$, etc.

Figure 3:
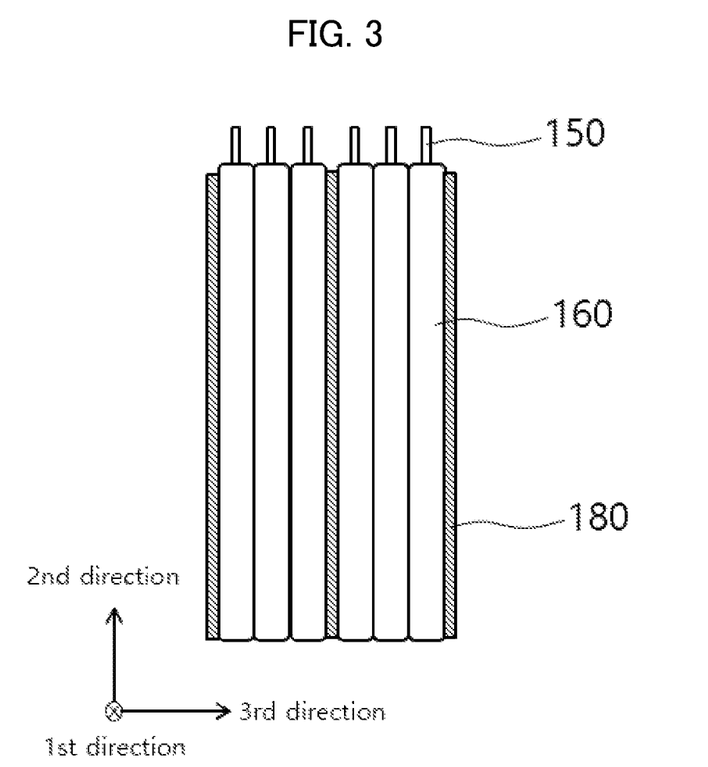
FIG. 3 is a schematic side-view illustrating a lithium secondary battery in accordance with exemplary embodiments.

FIG. 3 is a schematic side-view illustrating a lithium secondary battery in accordance with exemplary embodiments.

Referring to FIG. 3, the lithium secondary battery may include a plurality of pouch cells 200.

For example, the plurality of the pouch cells 200 may be stacked to form a pouch-type battery cell module. A method of stacking the pouch cell widely used in the related art may be used without a particular limitation.

In exemplary embodiments, the elastic foam layer 180 may be attached to at least one of the plurality of the pouch cells 200. For example, the elastic foam layer 180 may be formed on at least one surface of all the pouch cells 200 among the plurality of the pouch cells 200. Alternatively, the elastic foam layer 180 may be formed on at least one surface of some of the pouch cells 200. For example, the elastic foam layer 180 may be formed on facing surfaces of two different pouch cells 200 facing each other.

According to embodiments of the present invention, a method of fabricating the lithium secondary battery is provided. The method may include steps of preparing a pouch cell, stacking a plurality of the pouch cells, and forming an elastic foam layer on an outer surface of at least one of the plurality of the pouch cells.

In some embodiments, the elastic foam layer may be formed during stacking the plurality of the pouch cells. For example, some pouch cells 200 of plurality of the pouch cells may be stacked to form a preliminary pouch cell stack. The elastic foam layer 180 may be formed on an outer surface of an outermost pouch cell in the preliminary pouch cell stack, and then remaining pouch cells 200 may be stacked on the elastic foam layer 180 to form a pouch-type battery cell module. In this case, the elastic foam layer 180 may be disposed on facing surfaces of two different pouch cells 200.

In some embodiments, the elastic foam layer may be formed after stacking the pouch cells. For example, after stacking the plurality of the pouch cells 200, the elastic foam layer 180 may be formed on an outermost surface of the stack. In this case, the elastic foam layer 180 may be formed on an outermost surface of a stack structure of the pouch cells.

In some embodiments, a preliminary elastic foam layer may be formed during stacking the pouch cells, and then the elastic foam layer may be formed by foaming the preliminary elastic foam layer after stacking the pouch cells. A composition for forming the preliminary elastic foam layer before foaming or curing may be coated or a film for forming the preliminary elastic foam layer may be formed on the outer surface of the pouch cell 200.

In some embodiments, the preliminary elastic foam layer may be disposed on facing surfaces of two different pouch cells 200, or may be disposed on the outermost surface of the stack structure of the plurality of the pouch cells.

In some embodiments, the preliminary elastic foam layer may be formed on the outer surface of the pouch cell 200 after the electrode assembly is accommodated in the cell case 160. Alternatively, the preliminary elastic foam layer may be formed on the cell case 160 before the electrode assembly is accommodated, and then the electrode assembly is accommodated in the cell case 160.

In some embodiments, the preliminary elastic foam layer that may be formed on the outer surface of the pouch cell 200 may be converted into the elastic foam layer by performing the foaming. For example, the foaming may be performed after forming the preliminary elastic foam layer, or may be performed after stacking the pouch cells 200.

As described above, the elastic foam layer 180 may be formed through the foaming process after the formation of the preliminary elastic foam layer. Accordingly, damages to the electrode assembly due to foaming and curing of the elastic foam layer 180 may be prevented while easily controlling a foam ratio. Further, a process construction for the formation of the elastic foam layer 180 may be more simplified.

In exemplary embodiments, in the formation of the elastic foam layer, a composition including a foaming agent a polyol and an isocyanate may be coated on at least one surface of the pouch cell, and then may be cured. In this case, the elastic foam layer 180 may be designed to apply a uniform pressure to the pouch cell 200 by controlling a coating thickness of the composition, components of the composition and a foaming ratio so that cell assembly and cell stacking processes may be efficiently performed.

A curing method of the composition widely used in the related art may be used without a particular limitation. For example, the composition may be foamed and cured through a thermal curing or a UV curing.

A coating method of the composition widely used in the related art may be used without a particular limitation. For example, a spray coating, a blade coating and an inkjet coating may be used.

Hereinafter, preferred embodiments are proposed to more concretely describe the present invention. However, the following examples are only given for illustrating the present invention and those skilled in the related art will obviously understand that various alterations and modifications are possible within the scope and spirit of the present invention. Such alterations and modifications are duly included in the appended claims.

Example and Comparative Example

Example 100 g of a carbon-based particle composed of a graphite-based material having an average particle diameter of 11 μm was prepared. The prepared anode active material, styrene butadiene rubber (SBR) and carboxymethylcellulose (CMC) as a thickening agent were mixed with a mass ratio of 97.8:1.2:1.0, and dispersed in distilled water from which ions were removed to prepare a composition. The composition was coated on a surface of a Cu-foil current collector, and then dried and pressed to form an anode active material layer having a size of 10 cm×10 cm×50 cm and to prepare an anode having an electrode density of 1.50±0.05 g/cm$^3$.

$Li_{1.0}Ni_{0.6}Co_{0.2}Mn_{0.2}O_2$ as a cathode active material, Denka Black as a conductive agent, PVDF as a binder and N-methyl pyrrolidone as a solvent were mixed with a mass ratio of 46:2.5:1.5:50 to prepare a cathode mixture. The cathode mixture was coated on an aluminum substrate, and then dried and pressed to form a cathode.

The cathode and the anode obtained as prepared above were notched with a proper size and stacked, and a separator (polyethylene, thickness: 25 μm) was interposed between the cathode and the anode to form a battery. Each tab portion of the cathode and the anode was welded.

The welded cathode/separator/anode assembly was inserted in a pouch, and three sides of the pouch except for an electrolyte injection side were sealed. The tab portions were also included in sealed portions. An electrolyte was injected through the electrolyte injection side, and then the electrolyte injection side was also sealed. Subsequently, the above structure was impregnated for more than 12 hours.

The electrolyte was prepared by dissolving 1M $LiPF_6$ in a mixed solvent of EC/EMC/DEC (25/45/30; volume ratio), and then 1 wt % of vinylene carbonate, 0.5 wt % of 1,3-propensultone (PRS), and 0.5 wt % of lithium bis (oxalato) borate (LiBOB) were added.

A composition for forming an elastic foam layer was coated on a surface of the pouch cell fabricated as described above, and the composition was prepared as follows.

To synthesize flexible polyurethane for the formation of the elastic foam layer, 10 g of propylene oxide polyether polyol (PPG) having a molecular weight of 6,500 g/mol manufactured by SKC Corporation was dissolved in 20 g of N,N-dimethylformamide (DMF), and then 14 g of 4,4'-diphenyl-methane diisocyanate (MDI) was added. A mixing weight ratio of the polyol and the isocyanate was 1:1.4.

Further, 1,4-butatanediol (BD) of Aldrich Corporation as a chain extension agent and a catalyst was added by 0.03 wt % based on the weight of the polyol, and $H_2O$ as a foaming agent was added by 5 wt % based on the weight of the polyol, and then mixed using a high-speed homogenizer stirrer at 3,000 rpm. The reaction was completed when the solution started to have a cream color.

The composition was coated with a 200 μm thickness on the pouch cell surface and then heated for 10 minutes in a heating chamber of 35° C. to perform curing and foaming process. Accordingly, a pouch type lithium secondary battery was manufactured with a 1.3 mm-thickness polyurethane coated thereon.

To measure physical properties of the elastic foam layer, the composition for forming the elastic foam layer was cast in a silicon mold and then cured in an oven at 35° C. to prepare an analysis sample.

A tensile modulus of the prepared sample was 560 MPa, and a porosity of the sample was 80%.

Thereafter, pre-charging was performed for 36 minutes with a current (2.5 A) corresponding to 0.25 C. After 1 hour of degassing and aging for more than 24 hours, a charging and discharging for a formation was performed (charge condition CC-CV 0.2 C 4.2V 0.05 C CUT-OFF, discharge condition CC 0.2 C 2.5V CUT-OFF).

Subsequently, a standard charging and discharging was performed (charge condition CC-CV 0.5 C 4.2V 0.05 C CUT-OFF, discharge condition CC 0.5 C 2.5V CUT-OFF).

Comparative Example

A secondary battery was manufacture by the same method as that of Example except that the foaming agent $H_2O$ was not added in the composition for forming the elastic foam layer. In this case, the porosity of the elastic foam layer was 50% and a thickness of the elastic foam layer was 0.4 mm when the coating thickness was 200 μm.

Experimental Example

<Evaluation on Capacity Retention (Life-Span Property)>

Charging (CC/CV 0.5 C 4.3V 0.05 C CUT-OFF) and discharging (CC 1.0 C 3.0V CUT-OFF) were performed 200 times for the secondary battery according to Example and Comparative Example. Life-span retention was evaluated as a percentage of the value dividing the discharge capacity at the 200th cycle by the discharge capacity at the first cycle.

The results are shown in Table 1 below.

TABLE 1

|  | Capacity Retention |
| --- | --- |
| Example | 92% |
| Comparative Example | 80% |

Referring to Table 1, in Example where the elastic foam layer was formed on the outer surface of the pouch cell, excellent life-span property was achieved compared to that from Comparative Example prepared without forming the elastic foam layer.

What is claimed is:

1. A lithium secondary battery, comprising:
   stack structures, each of the stack structures including a plurality of pouch cells; and
   an elastic foam layer formed on an outer surface of at least two of the plurality of pouch cells,
   wherein a tensile modulus of the elastic foam layer is from 200 MPa to 800 MPa,
   wherein a porosity of the elastic foam layer is from 60% to 90%,
   wherein the elastic foam layer includes a cured product of a composition including a foaming agent, a polyol and an isocyanate, and the foaming agent is included in an amount from 0.1 wt % to 5 wt % based on a total weight of the composition,
   wherein the elastic foam layer is disposed on each of two outermost surfaces of the stack structure,
   a thickness of the elastic foam layer is from 0.1 mm to 10 mm, and
   the elastic foam layer is a film layer having a single layer structure,
   wherein the elastic foam layer is not disposed on facing surfaces of two different pouch cells within one of the stack structures, and
   the elastic foam layer is disposed on facing surfaces of two different stack structures of pouch cells.

2. The lithium secondary battery of claim 1, wherein the elastic foam layer is a coating layer directly formed on the outer surface of the at least one of the plurality of pouch cells.

3. The lithium secondary battery of claim 1, wherein the elastic foam layer includes at least one selected from the group consisting of polyurethane (PUR), polystyrene (PS) and polyolefin.

4. The lithium secondary battery of claim 1, wherein the elastic foam layer includes a flame retardant, a conductive material, or the flame retardant and the conductive material.

5. A method of fabricating a lithium secondary battery, comprising:
   preparing a plurality of pouch cells in which an electrode assembly including a cathode and an anode is accommodated;
   forming stack structures by stacking the plurality of pouch cells; and
   forming an elastic foam layer on an outer surface of at least two of the plurality of pouch cells
   wherein a tensile modulus of the elastic foam layer is from 200 MPa to 800 MPa,
   wherein a porosity of the elastic foam layer is from 60% to 90%,
   wherein the elastic foam layer includes a cured product of a composition including a foaming agent, a polyol and an isocyanate, and the foaming agent is included in an amount from 0.1 wt % to 5 wt % based on a total weight of the composition,
   wherein the elastic foam layer is disposed on each of two outermost surfaces of the stack structure,
   a thickness of the elastic foam layer is from 0.1 mm to 10 mm, and
   the elastic foam layer is a film layer having a single layer structure,
   wherein the elastic foam layer is not disposed on facing surfaces of two different pouch cells within each of the stack structures, and
   the elastic foam layer is disposed on facing surfaces of two different stack structures of pouch cells.

6. The method of claim 5, wherein the forming the elastic foam layer is performed during the stacking the plurality of pouch cells.

7. The method of claim 5, wherein the forming the elastic foam layer is performed after the stacking the plurality of pouch cells.

8. The method of claim 5, wherein the preparing the plurality of pouch cells comprises accommodating the electrode assembly in a cell case after forming a preliminary elastic foam layer on the cell case,
   wherein the forming the elastic foam layer comprises foaming the preliminary elastic foam layer.

9. The method of claim 5, further comprising forming a preliminary foam layer during the stacking the plurality of pouch cells,
   wherein the forming the elastic foam layer comprises foaming the preliminary foam layer after the stacking the plurality of pouch cells.

10. The method of claim 5, wherein the forming the elastic foam layer comprises coating a composition including a foaming agent, a polyol and an isocyanate on the outer surface of the at least two of the plurality of pouch cells.

11. The method of claim 10, wherein the forming the elastic foam layer further comprises curing the composition by a thermal curing or a UV curing.

12. The method of claim 5, wherein the forming the elastic foam layer comprises attaching an elastic foam film on the outer surface of the at least two of the plurality of pouch cells.

* * * * *